(12) United States Patent
Arambepola et al.

(10) Patent No.: US 8,781,052 B2
(45) Date of Patent: Jul. 15, 2014

(54) PHYSICAL LAYER CHANNEL SYNCHRONIZATION METHOD FOR HIGH BIT-RATE CABLE TRANSMISSIONS

(75) Inventors: Bernard Arambepola, Enfield (GB); Shaul Shulman, Ramat Gan (IL); Naor Goldman, Moshav Ein Vered (IL); Amos Klimker, Jerusalem (IL); Noam Tal, Givataim (IL)

(73) Assignee: Intel Corporation, Santa Clara, CA (US)

( * ) Notice: Subject to any disclaimer, the term of this patent is extended or adjusted under 35 U.S.C. 154(b) by 29 days.

(21) Appl. No.: 13/529,366

(22) Filed: Jun. 21, 2012

(65) Prior Publication Data
US 2013/0343501 A1 Dec. 26, 2013

(51) Int. Cl.
*H04J 3/06* (2006.01)
*H04L 7/04* (2006.01)
*H04L 7/00* (2006.01)

(52) U.S. Cl.
USPC .......... 375/371; 375/359; 375/354; 370/464; 370/480; 370/503; 370/498; 370/519; 370/517; 370/516; 713/400; 713/401

(58) Field of Classification Search
USPC .......... 375/359, 354, 371; 370/468, 465, 464, 370/480, 503, 498, 519, 517; 713/400, 401
See application file for complete search history.

(56) References Cited

U.S. PATENT DOCUMENTS

| | | | |
|---|---|---|---|
| 6,940,808 B1* | 9/2005 | Shields et al. | 370/216 |
| 2004/0163129 A1* | 8/2004 | Chapman et al. | 725/126 |
| 2007/0206600 A1* | 9/2007 | Klimker et al. | 370/394 |

\* cited by examiner

*Primary Examiner* — Chieh M Fan
*Assistant Examiner* — Michelle M Koeth
(74) *Attorney, Agent, or Firm* — Ellis B. Ramirez; Prass LLP

(57) ABSTRACT

A system and method are described to provide a next generation cable gateway/modem based on the DOCSIS standard with a scheme to synchronously combine channels in the physical layer to increase overall bit rates for coaxial cable data transmission. The systems and methods synchronize the counters associated with multiple channels, including continuity counters, at the transmitter to zero and then allow the counters on individual channels to increment individually. At the receiver, individual channel delays of individual channels will be thus recognizable based on the information provided by the counters associated with each channel. A buffer at the receiver is informed and used to individually delay one or more of the multiple channels to marry up continuity counter values. In this manner, the buffer acts to essentially equalize delays in individual channels with the continuity counter representing the mechanism for specifying the individual delays for the separate channels.

32 Claims, 4 Drawing Sheets

PHYSICAL LAYER CHANNEL SYNCHRONIZATION METHOD FOR HIGH BIT-RATE CABLE TRANSMISSIONS

BACKGROUND

1. Field of the Disclosed Embodiments

This disclosure relates to systems and methods to provide a next generation cable gateway and/or next generation cable modem based on the DOCSIS standard with a scheme to synchronously combine channels in the physical layer to increase an overall bit rate for coaxial cable data transmission.

2. Related Art

Much of the work in advancing communication technologies in recent years, particularly emphasizing higher data transmission speeds, has focused on advances in wireless technology transmission. Corresponding advances in communication capabilities and capacities for cable gateways and cable modems, and the technologies housed in these components, remain important. Consider that, for individual structures such as individual residential homes that include wireless networks internal to and throughout the structure, the wireless modem or modems deployed throughout the structure are likely connected to coaxial cables as a data transmission medium for the data to get to the structure where it is then disseminated throughout the structure wirelessly. In this regard, the cable backbone, which often includes some combination of fiber and coaxial cables, forms a significant and equally important part of an overall broadband network system. In hybrid fiber/coaxial cable systems, fiber transmission cables form a significant portion of the cable backbone, but the connections to individual structures and the wireless modems deployed therein are often made using coaxial cables.

The standard by which data transmission by cable is defined is the Data Over Cable Service Interface Specification or DOCSIS. DOCSIS is an international telecommunications standard that permits, among other technologies, the addition of high-speed data transfer to an existing cable television (CATV) system. DOCSIS is employed, for example, by many cable television operators to provide Internet access over existing hybrid fiber/coaxial cable network infrastructures. DOCSIS, therefore, defines the mechanism by which data is transmitted over cable to individual structures and the devices and access points that may be housed in those structures.

The DOCSIS 3.0 standard regarding physical layer specifications was released on Nov. 17, 2011. DOCSIS 3.0 is generally a specification revision that realized significantly increased transmissions speeds, and introduced support for Internet Protocol version 6 (IPv6).

Current cable systems based on the DOCSIS standard use the physical layer defined in the International Telecommunication Union (ITU) Recommendation J.83 Annexes A, B or C. This standard is based on single-carrier quadrature amplitude modulation (QAM) and the physical layer channel bandwidths of 6, 7 or 8 MHz. The protocol between the physical and MAC layers is generally an MPEG transport stream. Current versions of DOCSIS specify that 64-level or 256-level QAM (64-QAM or 256-QAM) be used for modulation of the downstream data transmissions, using an ITU-T J.83-AnnexB standard for 6 MHz channel operation, and a DVB-C modulation standard for 8 MHz channel (EuroDOCSIS) operation. QAM represents a format by which digital data is transmitted over coaxial cables. Adaptation of a 1024-level (1024-QAM) is being explored.

A DOCSIS architecture includes two primary components: a cable modem (CM) located at the end-user structure, and a cable modem termination system (CMTS) located at the CATV head end. Cable systems supporting on-demand programming use a hybrid fiber/coaxial cable system. Fiber optic lines bring digital signals to nodes in the system where they are converted into RF channels and modem signals on coaxial trunk lines. DOCSIS is exploring mechanisms to further increase bit rates carried by the coaxial cable trunk lines.

Based on its importance to the overall hybrid fiber/coaxial cable backbone, there is a requirement for higher data throughput capacity of the coaxial cable based systems that may be expressed in terms of bit rate and/or bandwidth. Standardization activities for coaxial cable transmission that advise equipment providers regarding the specifications for the equipment they provide are underway to provide specifications that define a standard for the increased data throughput capacity for coaxial cable data transmission.

SUMMARY OF THE DISCLOSED EMBODIMENTS

There is an emerging requirement to increase user bit rates in a next generation of hybrid fiber/coaxial cable systems based on DOCSIS. One option is to synchronize a large number of single-carrier downstream channels at the physical layer level to form one relatively large data channel to the MAC layer. An objective of such a scheme is to expand capacity with no changes to DOCSIS protocols beyond the physical layer and to accomplish this objective with minimal changes to the physical layer itself. In view of the above objectives, it may be advantageous to provide to the DOCSIS standard a simplified mechanism to realizing increased bit rates.

Exemplary embodiments of the systems and methods according to this disclosure may provide a scheme by which coaxial cable bit rates are increased in a hybrid fiber/coaxial cable network.

Exemplary embodiments may increase the effective bandwidth by combining multiple 6 MHz, 7 MHz or 8 MHz channels in the physical layer prior to transmission to achieve a higher bit rate channel.

Exemplary embodiments may provide a scheme to address differential delays that the individual channels may experience through the system. A mechanism to synchronize the individual channels to mediate the effects of differential delays may be provided.

Exemplary embodiments may combine individual channels with a same data rate or QAM. Differential delays that may be introduced by, for example, channel delays, processing delays, demodulation delays and the like may be uniquely addressed at a receiver end to synchronize data transmitted on the individual channels. The disclosed mechanism may facilitate combining the channel data at the receiver by compensating for certain of the in process/in transmission delays.

Exemplary embodiments may employ existing protocols in a unique manner to facilitate the above-mentioned combining and synchronizing schemes in order to simply implement an overarching mechanism to increase bit rates in coaxial cable systems with minimal adjustment of current protocols, e.g., MPEG packet protocol.

Exemplary embodiments may employ a data counter, such as the 4-bit continuity counter of the MPEG protocol, as a mechanism by which to synchronize individual channels by addressing differential delays between those channels. For example, channels may be synchronized for transmission by employing the 4-bit MPEG continuity counter.

Exemplary embodiments may synchronize the continuity counters of multiple channels at the transmitter to zero and then allow the counters on each channel to increment individually. At the receiver, accumulated channel delays of individual channels may thus be recognizable based on the information provided by the counters associated with each channel. A buffer at the receiver may then be informed and used to individually delay one or more of the multiple channels to synchronize the channels in a manner that marries up continuity counter values. In this manner, the buffer acts to essentially equalize delays in individual channels with the continuity counter representing the mechanism for specifying the individual delays for the separate channels.

Exemplary embodiments may produce an effective higher data rate by combining channels in the physical layer rather than at higher layers in the protocol.

Exemplary embodiments may provide a capacity to better employ frequency agility by providing identification and a synchronization capacity for individual channels at the physical layer. Having four 6 MHz channels synchronously arranged at the physical layer, for example, provides more flexibility and agility in the arrangement of the overall data transmission, i.e., individual 6 MHz bands can be managed easier than a single 24 MHz channel.

Exemplary embodiments may provide a scheme that more efficiently uses the available bandwidth while delivering higher bit rates for data transmission in coaxial cable transmission.

Exemplary embodiments may reduce data transmission complexity at the higher levels by providing a first combination of synchronized channels at the physical layer.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods to provide a next generation cable gateway and/or next generation cable modem based on the DOCSIS standard with a scheme to synchronously combine channels in the physical layer to increase an overall bit rate for coaxial cable data transmission will be described, in detail, with reference to the following drawings, in which.

DETAILED DESCRIPTION OF THE DISCLOSED EMBODIMENTS

The systems and methods to provide a next generation cable gateway and/or next generation cable modem based on the DOCSIS standard with a scheme to synchronously combine channels in the physical layer to increase an overall bit rate for coaxial cable data transmission will generally refer to this specific utility for those systems and methods. Exemplary embodiments described and depicted in this disclosure should not be interpreted as being specifically limited to any particular combination of communicating capabilities in a hybrid fiber/coaxial cable network node, or to any specific system infrastructure or cable to wireless modem configuration, and should not be interpreted as directed to any particular intended use. In fact, any selective transmission scheme for intelligently combining and synchronizing multiple channels in a physical layer prior to transmission, and any complementary configuration for a cable to wireless modem device for employment in that scheme, that may benefit from the systems and methods according to this disclosure is contemplated.

Specific reference to, for example, any particular modem device should be understood as being exemplary only, and not limited, in any manner, to any particular class of modem devices. The systems and methods according to this disclosure will be described as being particularly adaptable to being hosted on a cable backbone, including a hybrid fiber/coaxial cable backbone that provides a coaxial connection to a modem in a structure, but should not be considered as being limited to only these classes of modem devices.

Individual features and advantages of the disclosed systems and methods will be set forth in the description that follows, and will be, in part, obvious from the description, or may be learned by practice of the features described in this disclosure. The features and advantages of the systems and methods according to this disclosure may be realized and obtained by means of the individual elements, and combinations of those elements, as particularly pointed out in the appended claims. While specific implementations are discussed, it should be understood that this is done for illustration purposes only. A person skilled in the relevant art will recognize that other components and configurations may be used without departing from the spirit and scope of the subject matter of this disclosure.

As indicated above, current cable systems based on the DOCSIS standard use the physical layer, the single-carrier QAM and the physical layer channel bandwidths, 6, 7 or 8 MHz. An advantage of the systems and methods of this disclosure lies in synchronously combining many of these channels to form one large channel in a manner such as that depicted in exemplary manner in FIG. 1.

Figure 1:
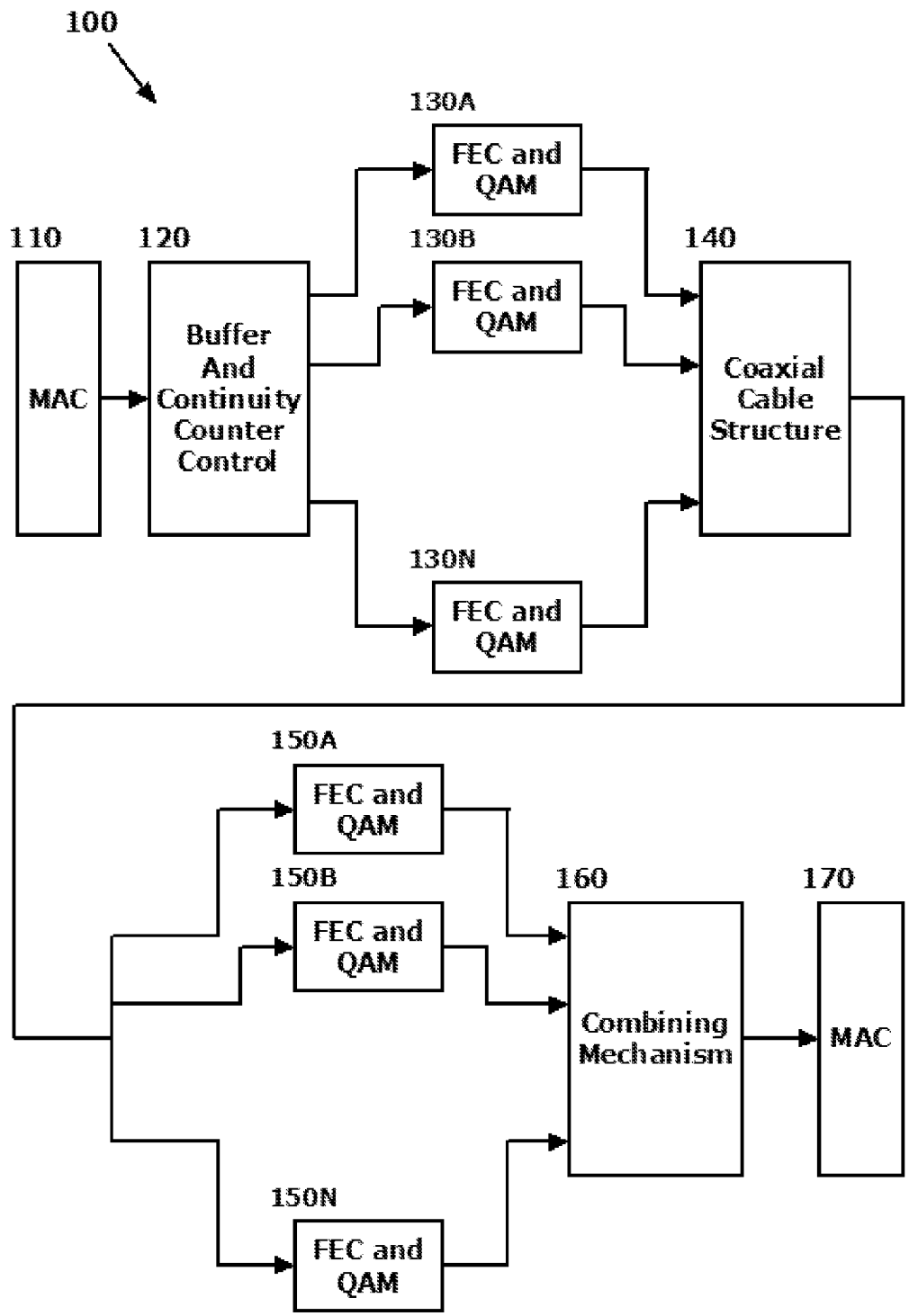
FIG. 1 illustrates an overview of an exemplary communication stream that may be adapted with the systems and methods according to this disclosure.

FIG. 1 illustrates an overview of an exemplary communication stream 100 that may be adapted with the systems and methods according to this disclosure. As shown in FIG. 1, an MPEG transport stream from a MAC layer 110 may pass through a buffer 120 for continuity control. The MPEG data packet includes a 184 byte data sector (payload) and a 4 byte or 32 bit header, including a 4 bit counter for continuity control. The MPEG transport stream may be distributed among the N individual channels 130A-N for transmission via a coaxial cable structure 140. All of the distributed N channels may not have the same bit rate because the QAM constellations of all of the channels need not be the same.

The QAM transmissions of all of the N distributed the channels may be synchronized, e.g., all the channels may be modulated in the baseband using the same clock. Then these transmissions may be up-converted to different channel frequencies and transmitted through the same cable medium, represented in FIG. 1 as the coaxial cable structure 140.

At the receiver each received channel 150A-N may be down-converted to baseband and demodulated independently to output a sequence of MPEG transport packets. Different channels may have different frequency responses and different group delays, which may need to be accounted for in combining the MPEG transport packets from individual channels in some form of a combining mechanism 160 for combining the received channels at the physical layer level to form a single MPEG output transport stream to be provided to a receiving MAC layer 170.

Because an objective of the systems and methods of this disclosure is to avoid changes to the protocols above the physical layer, MPEG transport packet formats will be maintained, i.e., remain unchanged, for the purpose of physical layer level combining. The proposed schemes may make use of the 4-bit continuity counter field of the MPEG transport packet header. This field is already present in MPEG transport packet header.

Figure 2:
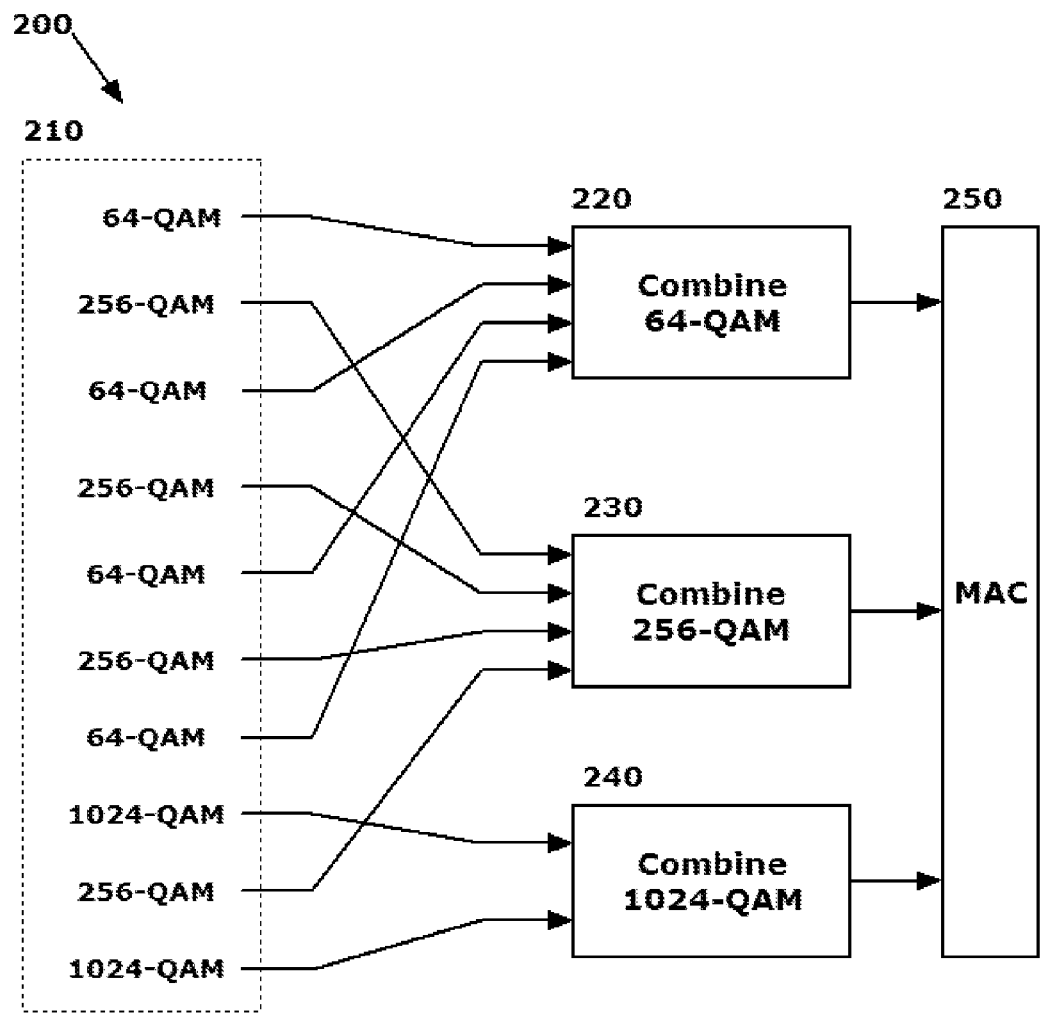
FIG. 2 illustrates an overview of a signal separation scheme adaptable to the systems and methods according to this disclosure.

FIG. 2 illustrates an overview of a signal separation scheme 200 adaptable to the systems and methods according to this disclosure. As shown in FIG. 2, channels 210 may be according to a number of QAM constellations. Channels with same QAM constellation may be separately combined 220,230, 240. Based on the data transmission being synchronized data transmission, all channels with same QAM constellation may have approximately a same latency and hence the MPEG transport packets on individual channels may not be staggered by more than one packet. To align the packet sequence, some bits, e.g. one bit B0, may be assigned as a continuity counter. That is, bit B0 may be toggled between 0 and 1 in successive packets in each channel at the transmitter. At the receiver, for all channels with a same QAM constellation, transport packets with the same value in this bit may then be ordered sequentially. If the differential delay is larger, then all 4 bits may be used. This 4-bit count may be incremented by 1 modulo 16 in successive packets in each channel. The 4-bit counter value may be treated as a two's complement number with range −8 to +8. If the differential delays are in the range [−7, 7] then the delay compensation may be performed at the receiver to equalize the counter values in parallel channels before sequential ordering of the packet sequence.

This scheme may yield multiple packet streams, as depicted, presented to the MAC layer 250, the multiple packet streams may include, for example, one for each of the QAM constellations, 64-QAM (220), 256-QAM (230) and 1024-QAM (240). The multiple streams may be passed for bonding within the MAC layer 250 in the manner shown. The MAC layer 250 of current DOCSIS has the capability to bond a few physical layer channels and hence such a capacity is well understood.

Individual channels need not occupy successive slots in the channel frequency plan. Successive slots could be assigned to frequencies in a manner that makes optimal use of the transmission medium, for example, to avoid collision with existing legacy channels or to avoid frequency bands susceptible to external interference.

Furthermore, individual channels can be tailored to characteristics of the transmission medium. Some channels that have relatively low Signal-To-Noise Ratios (SNR) may use 64-QAM. Others may use 256-QAM, and very good channels may use 1024-QAM. Frequency agility in this manner is an advantage of the proposed method.

The proposed approach also has silicon area advantages. Compare two scenarios. The first is having two channels each with symbol rate Rs. The second is forming a single channel with symbol rate 2Rs. When the symbol rate is doubled, the equalizer length is doubled since the symbol period is halved. Hence, the latter scenario will have an equalizer of double the length running at twice the rate as the first scenario. The proposed method for combining channels will have a linear growth in complexity with respect to the number of channels compared to the square-law growth complexity in the alternative approach.

No specific reference to a particular forward error correction (FEC) method that may be used is implicated by this proposal because selection of a particular FEC method is considered irrelevant to this proposal. To minimize hardware changes, one may retain the FEC of the ITUT-T recommendation J83. Alternatively, one may employ, for example, a Low Density Parity Check (LDPC) decoder or a turbo decoder that provides better coding gain.

This proposal is directed at configuring the physical layer of a cable network to achieve a high bit rate. Both the transmitter and the receiver may be configured to accomplish the higher bit rates in the manner proposed. Legacy configurations are exploited to a maximum extent possible.

Combining several channels at the physical layer level may reduce the complexity of channel bonding in higher layers. For example, a 6 MHz 256-QAM channel has a data-rate of about 39 Mbits/sec. If a 1 Gbit/sec data rate is desired, approximately 26 channels would need to be combined to achieve such a data rate. This is a quite a large number of channels to be combined in the higher layers. Certain efficiencies, and a significant reduction in complexity may be realized when some or all of the channel combining is undertaken at the physical layer level.

As an example consider combining eight 6 MHz channels. This is equivalent to creating a single 48 MHz channel. However, the complexity of one 48 MHz channel is eight times more that of eight 6 MHz channels. This is because of the square-law growth in complexity of wideband channels, i.e., a 12 MHz receiver is four times as complex as a 6 MHz receiver. Handling two 6 MHz channels is only twice as complex as handling one 6 MHz channel, i.e., according to a linear growth in complexity. Therefore, by combining channels at physical layer level, a same functionality of a wide channel may be achieved without significantly increasing the complexity of managing the channels. Furthermore, wide channels have other disadvantages. If an interference occurs within the channel bandwidth, for example, a complete wide channel could be affected, thereby affecting all of the data. If multiple narrowband channels are used, the interference will affect only one channel and hence only part of the data. Forward error correction at the receiver may restore the lost data or the affected narrowband channel could be transmitted at another frequency. There is no need to transmit the eight 6 MHz channel channels as adjacent channels. Wideband channels do not have this level of frequency agility.

As such, the proposed scheme includes use of many narrowband channels and synchronization of these channels at the physical layer level so that layers above the physical layer level see no difference between this combined channel and a single wideband channel.

As indicated above, all of the channels being combined may have the same data rate. A difficulty in combining channels at physical layer level may be encountered based on the presence of in-transmission delays. Although the channels are transmitted at the same time, there could be slightly different delays through the system. When the channels are demodulated independently, i.e., not in a synchronous manner, there are no assurances that N data packets transmitted at the same time will appear at the outputs of the demodulators and channel decoders at the same time. Channel decoders in this context are those that may accomplish forward error correction. Forward error correction is recognized generically as a mechanism for correcting for some errors in transmitted bits that may arise due to noise and interference in a particular channel.

To account for differential delays and to synchronize received packet streams across different channels, an m-bit counter may be associated with each transmitted data packet. This m-bit counter may be part of the packet header. This m-bit counter may be incremented by one for every packet in each channel. This m-bit counter may be a modulo $2^m$ counter in that after it reaches the maximum number of the m-bit pattern, i.e., all ones, it wraps to zero.

At the transmitter, a set of packets transmitted at any given time will have the same counter value. This will not necessarily be the case at the receiver after demodulation and channel decoding. Differences in the counter values may be used to identify differential delays for particular data packets through the system. A set of predetermined delays may be introduced to compensate for the differential delays prior to combining the channels at a physical layer at the receiver.

As an example, current cable DOCSIS transmissions use an MPEG2 transport stream packet format. An MPEG transport packet consists of a 4-byte header and a 184-byte payload. 4 bits of this 4-byte (or 32-bit) header act as a continuity counter. The 4 bit continuity counter is used in some applications to identify lost packets. For example, if the continuity counter of the current packet is 3 and that of the preceding packet is 1 then the system knows that a packet has been lost during transmission.

To avoid changes to existing protocol, this continuity counter may be employed as the proposed m-bit counter, i.e., m=4. So the MPEG continuity counter may have a dual purpose. The 4-bit counter has a range 0 to 15 (after counting up to 15, it wraps back to zero). However, it may be most appropriate to treat this number range as a two's complement number range −8 to +8. This counter mechanism may allow for a correction for a range of delay from −7 to +7.

One may treat a counter value 14 (modulo 16) as being equivalent to −2. A packet from the channel with counter value 14 may be the first to arrive. The packet with count value 14 could have arrived 14 packets after the packet with count value of 0 or it could have arrived two packets before. There is an ambiguity. However, if the differential delay is relatively small it is possible to assume that it is in the range −7 to +7 and thereby avoid the ambiguity. If the actual delay can be outside −7 to +7 range, a larger counter may be needed.

Delays of other channels are defined with respect to the earliest packet to arrive having a particular counter value. In the latency compensation scheme, the channel that arrives first is delayed most and the channel coming last having the particular counter value has a zero delay. Programmable delays in individual channels may be implemented using first in first out (FIFO) data buffers.

After differential delays are applied to the transport packets having the same counter value, the transport packets with the same counter value will have been made synchronous. The transport packets with the same counter value and delays applied can then be concatenated at the physical layer level to form the large bit rate channel and can be passed to the higher layers at the receiver.

Although this method has been described with reference to cable transmissions, it may have applications in wireless communication as well. The data packet structure as well need not be MPEG.

Figure 3:
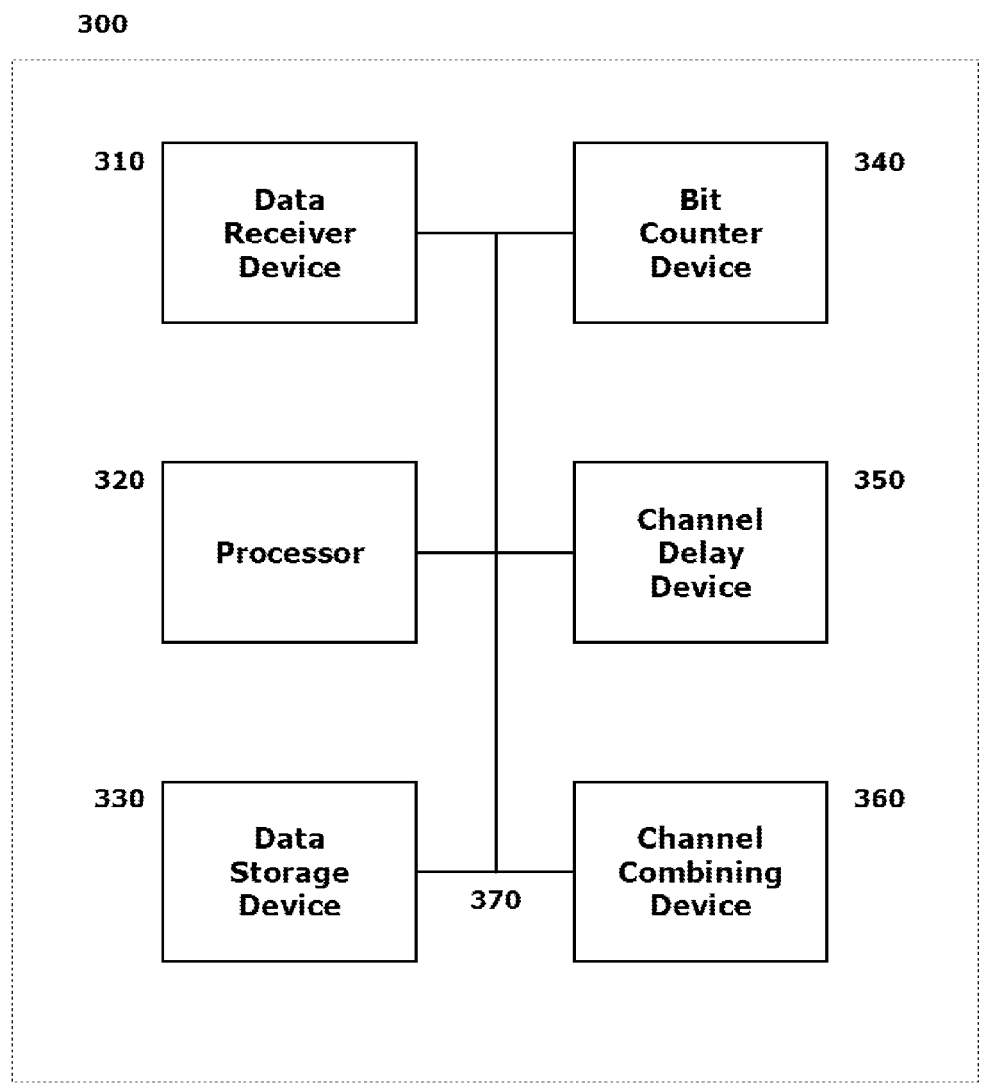
FIG. 3 illustrates a block diagram of an exemplary receiving node device for implementing a synchronization scheme according to this disclosure.

FIG. 3 illustrates a block diagram of an exemplary receiving node device 300 for accomplishing a synchronization scheme according to this disclosure. As shown in FIG. 3, the exemplary receiving node device 300 may include a data receiver device 310 by which data transport packets are received over a coaxial cable medium by the exemplary receiving node device 300. In this manner, the data receiver device 310 acts as an initial data receiving interface. Data receiver device 310 may constitute multiple data receiving interfaces for individually receiving transmitted channels according to individual and separate QAM constellations, as discussed above. Data receiver device 310, and/or each of a plurality of data receiving interfaces that may constitute the data receiver device 310, may include a demodulating and/or decoding unit.

The exemplary receiving node device 300 may include one or more local processors 320 for individually undertaking the processing and control functions that are carried out by the exemplary receiving node device 300 for accomplishing bit counter/delay detection and channel synchronization. Processor(s) 320 may include at least one conventional processor or microprocessor that interprets and executes instructions and processes incoming data in order to enable data channel synchronization in the exemplary receiving node device 300.

The exemplary receiving node 300 may include one or more data storage devices 330. Such data storage device(s) 330 may be used to store data, and operating programs or applications to be used by the exemplary receiving node device 300, and specifically the processor(s) 320. Data storage device(s) 330 may include a random access memory (RAM) or another type of dynamic storage device that stores information and instructions for execution by the processor(s) 320. Data storage device(s) 330 may also include a read-only memory (ROM), which may include a conventional ROM device or another type of static storage device that stores static information and instructions for execution by the processor(s) 320. The data storage device(s) 330 will generally be those that are integral to the exemplary receiving node device 300, and not some other data storage device that may be provided external to, and in wireless communication with, the exemplary receiving node device 300. The data storage device(s) 330 may store delay functions, algorithms and/or settings for reference in executing individual channel delays with the exemplary receiving node device 300.

The exemplary receiving node device 300 may include a bit counter device 340 that detects a bit counter value for each received packet, the bit counter device 340 detecting packets with a same bit counter value which may be set at a transmitter, and detecting the packets after demodulation or decoding. The bit counter device 340 may detect different bit counter values for channels having a same data rate or QAM. The bit counter device 340 may detect individual bit counter values for data packets that were putatively transmitted at a same time and marked with a same bit counter value. Once all packets having a same bit counter value are detected by the bit counter device 340, information on the detected bit counter values may be passed to other elements of the exemplary receiving node device 340 for further processing.

The exemplary receiving node device 300 may include a channel delay device 350 by which the exemplary receiving node device 300 may apply a differential delay to earlier detected packets, for example, having same bit counter values in order that earlier-received data packets having a same bit counter value may be delayed until the bit counter device 340 detects receipt of the last of the data packets having the same bit counter value.

The exemplary receiving node device 300 may include a channel combining device 360 for combining packets of individual channels delayed according to individual delays such that packets with same bit counter values, transmitted at the same time, with individual delays applied, may be concatenated at the physical layer level prior to passing to the MAC layer.

All of the various components of the exemplary receiving node device 300, as depicted in FIG. 3, may be connected by one or more data/control busses 370. The data/control bus(ses) 370 may provide internal wired, or wireless, communication between the various components of the exemplary receiving node device 300, as all of those components are housed integrally in the exemplary receiving node device 300.

It is anticipated that the various disclosed elements of the exemplary receiving node device 300 may be arranged in combinations of sub-systems as individual components or combinations of components, but regardless of the specific configuration, all of the depicted components may be integral to a single unit that is the exemplary receiving node device 300.

Figure 4:
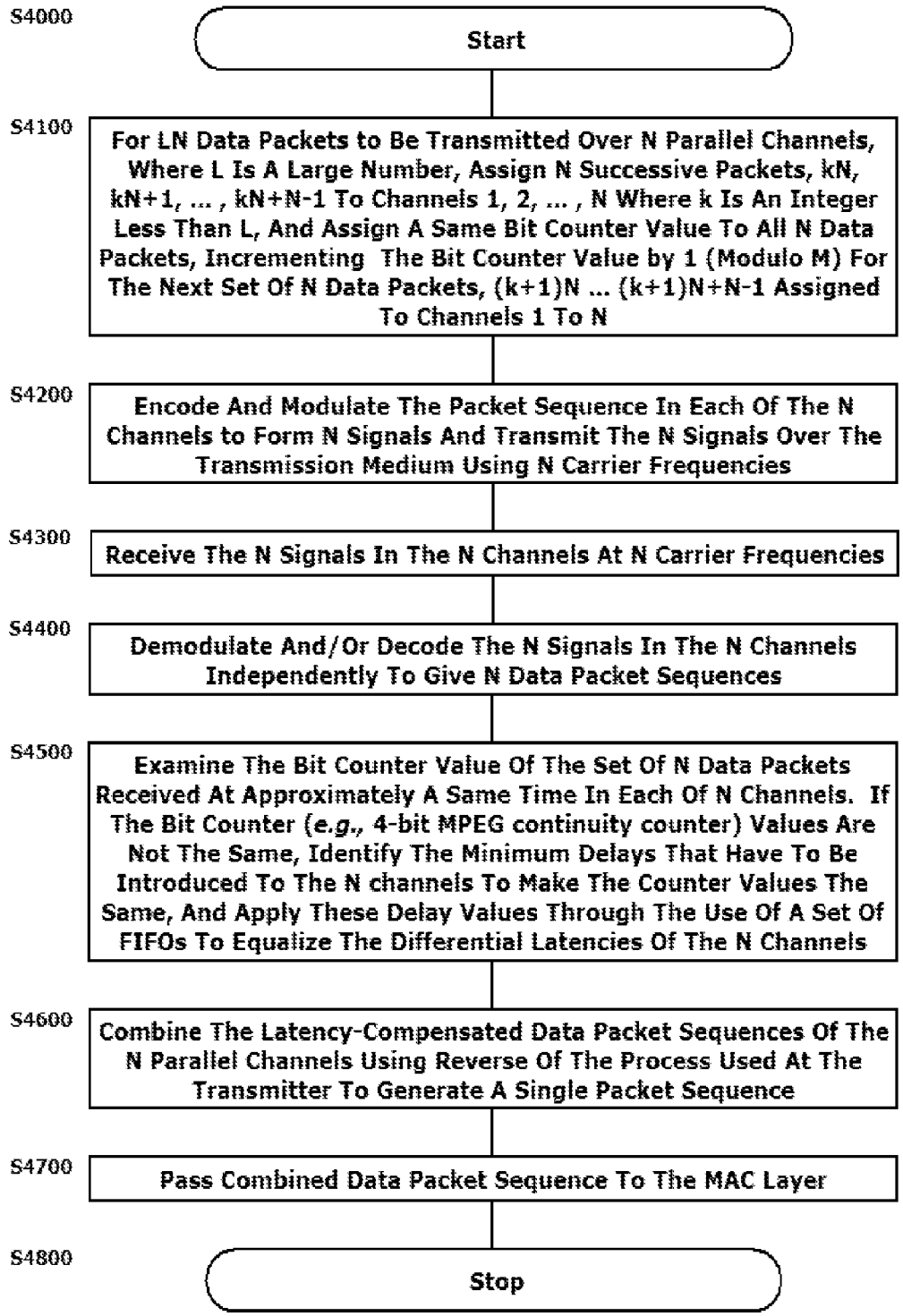
FIG. 4 illustrates a flowchart of an exemplary method for implementing a synchronization scheme according to this disclosure.

The disclosed embodiments may include a method to synchronously combine channels in the physical layer level to increase an overall bit rate for coaxial cable data transmission. A flowchart of such an exemplary method is depicted in FIG. 4. As shown in FIG. 4, operation of the method commences at Step S4000 and proceeds to Step S4100.

In Step S4100, a same bit counter value is assigned to a number (N) data packets to be transmitted via N separate channels at a transmitter side prior to transmission. The counter may be initialized to zero and incremented by one (modulo another number M) after the transmission of one packet in each channel. Operation of the method proceeds to Step S4200.

In Step S4200, the sequence of data packets in each channel is encoded, modulated and transmitted over the transmission medium using N carrier frequencies. Operation of the method proceeds to Step S4300.

In Step S4300, the N transmitted signals are received. Operation of the method proceeds to Step S4400.

In Step S4400, the signal in each of the N channels is demodulated and decoded to give a sequence of packets in each of the N channels. Operation of the method proceeds to Step S4500.

In Step S4500, the bit counters of the N packets received approximately at the same time are examined. If these are not the same, the minimum differential delays that have to be applied to the N channels to equalize the N bit counter values are determined. These differential delays are applied by means of first in first out (FIFO) buffers to equalize the latencies across the N channels. Operation of the method proceeds to Step S4600.

In Step S4600, the latency equalized data packets of the N channels are combined to form one data packet sequence. Operation of the method proceeds to Step S4700.

In Step S4700, the combined data packet sequence is passed to a MAC layer. Operation the method proceeds to Step S4800, where operation of the method ceases.

The disclosed embodiments may include a non-transitory computer-readable medium storing instructions which, when executed by a processor, may cause the processor to execute the steps of a method as outlined above.

The above-described exemplary systems and methods reference certain conventional components to provide a brief, general description of suitable communication and processing environments in which the subject matter of this disclosure may be implemented for familiarity and ease of understanding. Although not required, embodiments of the disclosure may be provided, at least in part, in a form of hardware circuits, firmware or software computer-executable instructions to carry out the specific functions described, such as program modules, being executed by a processor. Generally, program modules include routine programs, objects, components, data structures, and the like that perform particular tasks or implement particular data types.

Those skilled in the art will appreciate that other embodiments of the disclosed subject matter may be practiced in communication network environments with many types of heterogeneous communication equipment and computing system configurations.

Embodiments may also be practiced in distributed network communication environments where tasks are performed by local and remote processing devices, generally as outlined above, that are linked to each other by hardwired links, wireless links, or a combination of both through a communication network. In a distributed network environment, program modules may be located in both local and remote data storage devices.

Embodiments within the scope of the present disclosure may also include computer-readable media having stored computer-executable instructions or data structures that can be accessed, read and executed by a particular module or device in a receiving node. Such computer-readable media can be any available media that can be accessed by a processor in, or in communication with, the receiving node device. By way of example, and not limitation, such computer-readable media can comprise RAM, ROM, EEPROM, CD-ROM, DVD-ROM, flash drives, thumb drives, data memory cards or other analog or digital data storage devices that can be used to carry or store desired program elements or steps in the form of accessible computer-executable instructions or data structures. When information is transferred or provided over a network or another communications connection the receiving processor properly views the connection as a computer-readable medium. Thus, any such connection is properly termed a computer-readable medium. Combinations of the above should also be included within the scope of the computer-readable media for the purposes of this disclosure.

Computer-executable instructions include, for example, non-transitory instructions and data that can be executed and accessed respectively to cause network components, or a processor in a receiving network node, to perform certain of the above-specified functions, individually, or in combination. Computer-executable instructions also include program modules that are remotely stored for access by the receiving node device to be executed by processors in the receiving node device when that device is caused to communicate in the disclosed network environment across any communication link such as those depicted and described in exemplary manner above.

The exemplary depicted sequence of executable instructions, or associated data structures for executing those instructions, represents one example of a corresponding sequence of acts for implementing the functions described in the steps. The steps of the method, as depicted, are not intended to imply any particular order to the depicted steps except as may be necessarily inferred when one of the depicted steps is a necessary precedential condition to accomplishing another of the depicted steps.

Although the above description may contain specific details, they should not be construed as limiting the claims in any way. Other configurations of the described embodiments of the disclosed systems and methods are part of the scope of this disclosure. For example, the principles of the disclosure may be applied to each individual receiving node in a particular network's coverage area where each receiving node device may individually and independently operate within the depicted and described system. This enables each user to use the benefits of the disclosure even if any one of the large number of possible applications do not need a specific aspect of the functionality described and depicted in this disclosure. In other words, there may be multiple instances of the components each processing the content in various possible ways. It does not necessarily need to be one system used by all end users. Accordingly, the appended claims and their legal equivalents should only define the disclosure, rather than any specific examples given.

We claim:

1. A method for synchronizing cable data channels, comprising:
   receiving a plurality of data packets transmitted over a plurality of data channels at a receiving node, wherein each data packet has a packet header with a continuity counter field;
   combining the plurality of data packets into groups based on a transmission constellation respective to the data channel in which each data packet is transmitted;
   segregating each group of the plurality of data packets into subgroups according to same bit counter values identified in the continuity counter field, each subgroup comprising a number of data packets transmitted at a same time over the plurality of data channels and identified as having the same bit counter value;
   assigning differential delays, with a processor, to each of the number of data packets in a particular subgroup to synchronize data contained in the data packets; and
   concatenating, with the processor, the data packets with the differential delays assigned at a physical layer level at the receiving node.

2. The method of claim 1, wherein a transmitter assigns the bit counter value to each packet before transmission, the bit counter value being the same for the number of data packets transmitted over the plurality data channels at the same time.

3. The method of claim 2, the bit counter value being assigned by an m-bit counter associated with the transmitter.

4. The method of claim 3, the plurality of data packets being MPEG data packets, and the m-bit counter being a 4-bit continuity counter in a header for the MPEG data packets.

5. The method of claim 1, further comprising at least one of demodulating and decoding the received plurality of data packets prior to the assigning of the differential delays at the receiving node.

6. The method of claim 5, further comprising determining that a last data packet having the same bit counter value is received at the receiving node.

7. The method of claim 6, further comprising:
   holding all data packets having the same bit counter value until it is determined that the last data packet having the same bit counter value is received, and
   assigning individual differential delays to the data packets based on a time of reception of each data packet having the same bit counter and a time of reception of the last data packet having the same bit counter value.

8. The method of claim 1, further comprising forwarding the concatenated data packets to higher logic layers by the receiving node.

9. The method of claim 1, wherein the transmission constellation is a plurality of quadrature amplitude modulation (QAM) constellations.

10. The method of claim 9, the plurality of QAM constellations including at least a 64-QAM constellation, a 256-QAM constellation and a 1024-QAM constellation.

11. The method of claim 1, the plurality of channels including a plurality of single-carrier and multi-carrier modulation schemes.

12. A device for synchronizing cable data channels, comprising:
   a receiving device that receives a plurality of data packets transmitted over a plurality of data channels, wherein each data packet has a packet header with a continuity counter field;
   a channel combining device to combine the plurality of data packets into groups based on a transmission constellation respective to the data channel in which each data packet is transmitted;
   a bit counter device that detects individual bit counter values in the continuity counter field for each of the plurality of data packets, and to segregate each group of the plurality of data packets into subgroups according to identified same bit counter values, each subgroup comprising a number of data packets transmitted at a same time over the plurality of data channels and identified as having the same bit counter value;
   a channel delay device that assigns differential delays to each of the number of data packets in a particular subgroup to synchronize data contained in the data packets; and
   a channel combining device that concatenates the data packets with the differential delays assigned at a physical layer level.

13. The device of claim 12, the receiving device receiving the plurality of data packets from a transmitter that assigns the bit counter value to each packet before transmission, the bit counter value being the same for the number of data packets transmitted over the plurality data channels at the same time.

14. The device of claim 13, the bit counter value being assigned by an m-bit counter associated with the transmitter.

15. The device of claim 14, the plurality of data packets being MPEG data packets, and the m-bit counter being a 4-bit continuity counter in a header for the MPEG data packets.

16. The device of claim 12, further comprising at least one of a demodulating device that demodulates the received plurality of data packets and a decoding device that decodes the received plurality of data packets prior to the channel delay device assigning the differential delays.

17. The device of claim 16, the bit counter device determining that a last data packet having the same bit counter value is received and holding all data packets having the same bit counter value until it is determined that the last data packet having the same bit counter value is received, and the channel delay device assigning individual differential delays to the data packets based on a time of reception of each data packet having the same bit counter and a time of reception of the last data packet having the same bit counter value.

18. The device of claim 12, the channel combining device forwarding the concatenated data packets to higher logic layers.

19. The device of claim 12, wherein the transmission constellation is a plurality of quadrature amplitude modulation (QAM) constellations.

20. The device of claim 19, the plurality of QAM constellations including at least a 64-QAM constellation, a 256-QAM constellation and a 1024-QAM constellation.

21. The device of claim 12, the plurality of channels including a plurality of singlecarrier and multi-carrier modulation schemes.

22. A non-transitory computer-readable medium storing computer-readable instructions which, when executed by a processor, causes the processor to execute a method for synchronizing cable data channels, the method comprising:
   receiving a plurality of data packets transmitted over a plurality of data channels at a receiving node, wherein each data packet has a packet header with a continuity counter field;
   combining the plurality of data packets into groups based on a transmission constellation respective to the data channel in which each data packet is transmitted;

segregating each group of the plurality of data packets into subgroups according to same bit counter values identified in the continuity counter field for the plurality of data packets, each subgroup comprising a number of data packets transmitted at a same time over the plurality of data channels and identified as having the same bit counter value;

assigning differential delays to each of the number of data packets in a particular subgroup to synchronize data contained in the data packets; and concatenating the data packets with the differential delays assigned at a physical layer level at the receiving node.

23. The non-transitory computer-readable medium of claim 22, wherein a transmitter assigns the bit counter value to each packet before transmission, the bit counter value being the same for the number of data packets transmitted over the plurality data channels at the same time.

24. The non-transitory computer-readable medium of claim 23, the bit counter value being assigned by an m-bit counter associated with the transmitter.

25. The non-transitory computer-readable medium of claim 24, the plurality of data packets being MPEG data packets, and the m-bit counter being a 4-bit continuity counter in a header for the MPEG data packets.

26. The non-transitory computer-readable medium of claim 22, further comprising at least one of demodulating and decoding the received plurality of data packets prior to the assigning of the differential delays at the receiving node.

27. The non-transitory computer-readable medium of claim 26, further comprising determining that a last data packet having the same bit counter value is received at the receiving node.

28. The non-transitory computer-readable medium of claim 27, further comprising:

holding all data packets having the same bit counter value until it is determined that the last data packet having the same bit counter value is received, and assigning individual differential delays to the data packets based on a time of reception of each data packet having the same bit counter and a time of reception of the last data packet having the same bit counter value.

29. The non-transitory computer-readable medium of claim 22, further comprising forwarding the concatenated data packets to higher logic layers by the receiving node.

30. The non-transitory computer-readable medium of claim 22, wherein the transmission constellation is a plurality of quadrature amplitude modulation (QAM) constellations.

31. The non-transitory computer-readable medium of claim 30, the plurality of QAM constellations including at least a 64-QAM constellation, a 256-QAM constellation and a 1024-QAM constellation.

32. The non-transitory computer-readable medium of claim 22, the plurality of channels including a plurality of single-carrier and multi-carrier modulation schemes.

* * * * *